United States Patent Office 3,453,836
Patented July 8, 1969

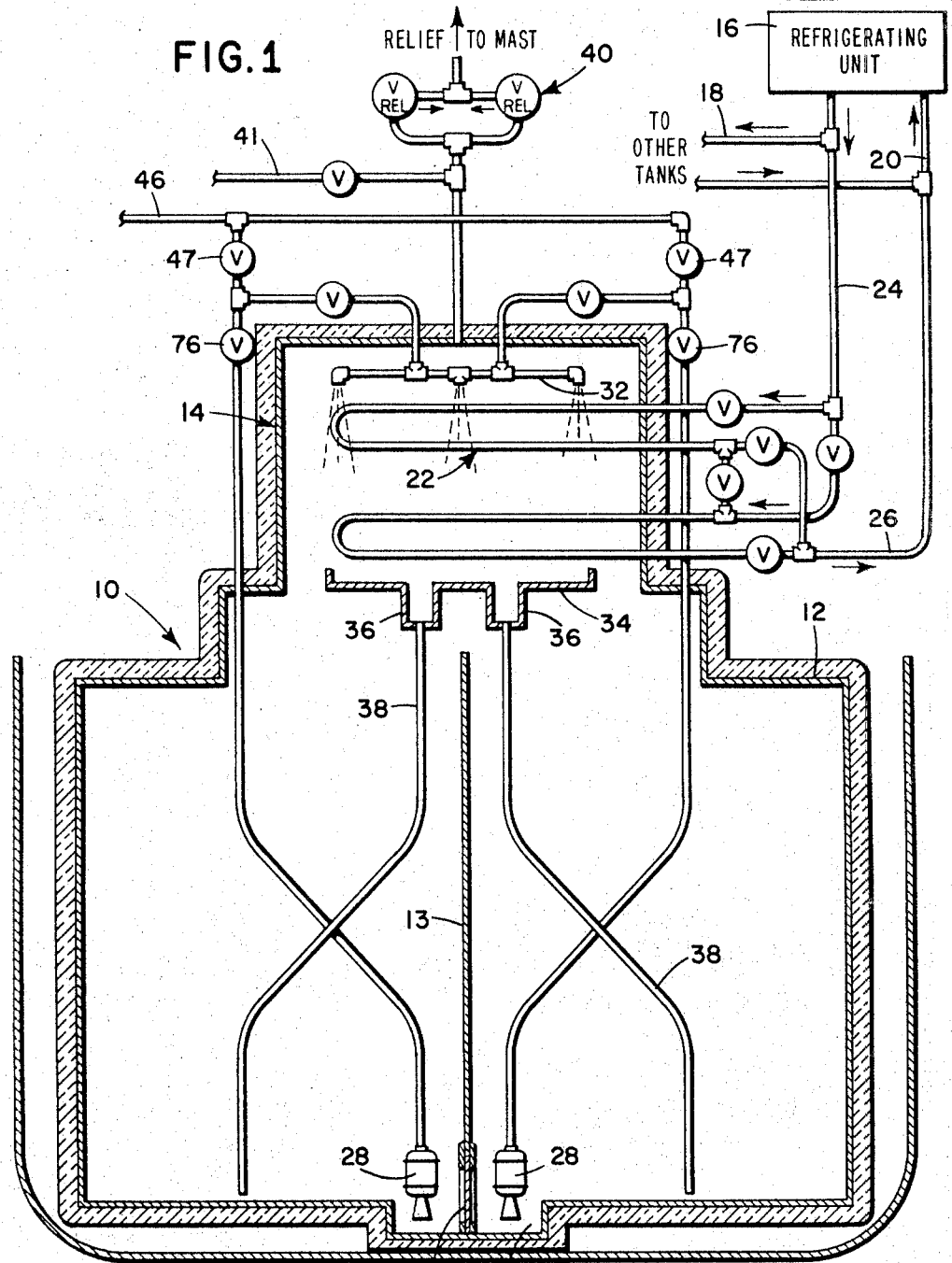

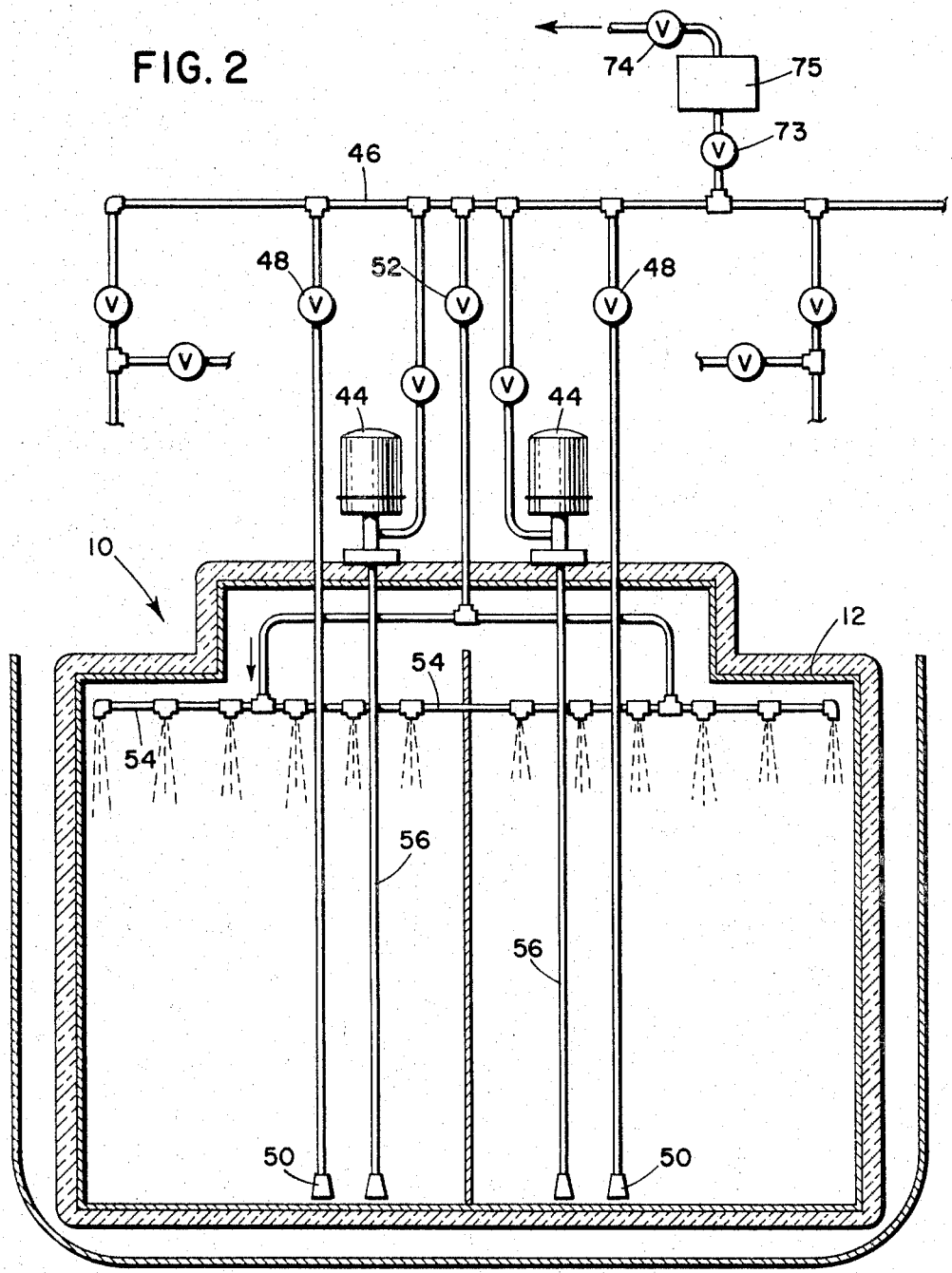

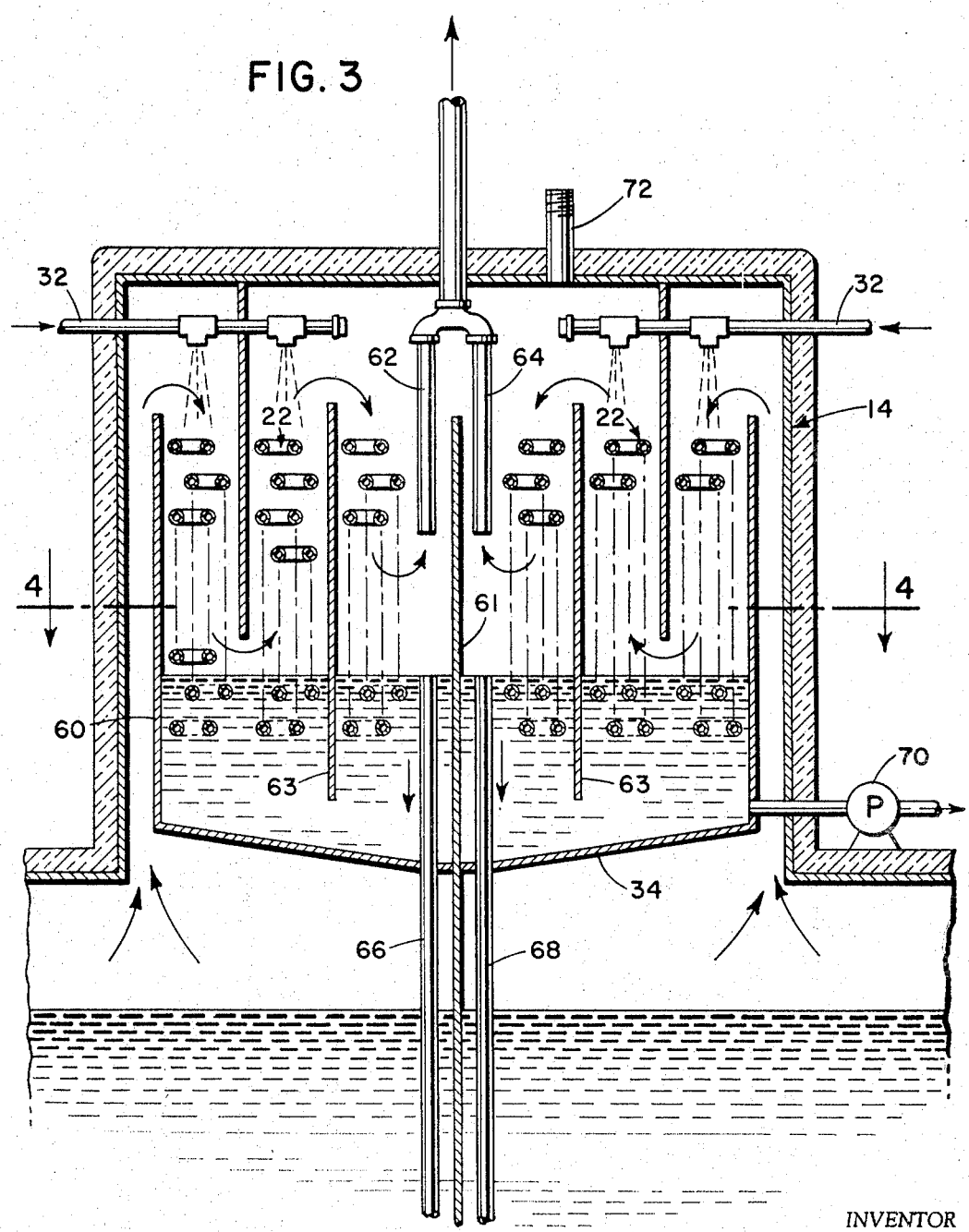

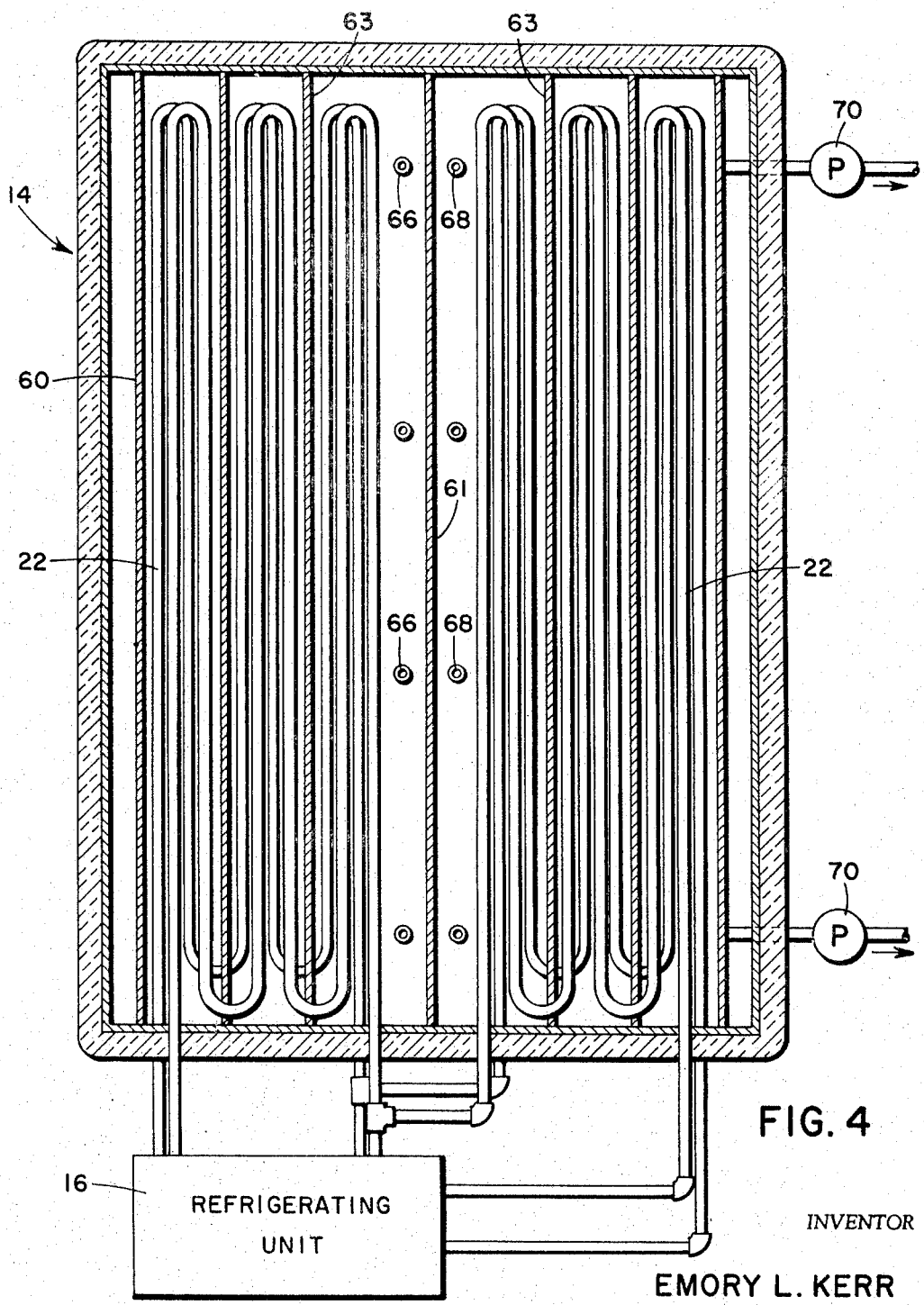

3,453,836
LIQUEFIED PETROLEUM GAS TANKER
Emory L. Kerr, Cranford, N.J., assignor to John J.
McMullen, Montclair, N.J.
Filed July 24, 1967, Ser. No. 655,377
Int. Cl. B63j 2/14
U.S. Cl. 62—45
20 Claims

ABSTRACT OF THE DISCLOSURE

A tanker for transporting liquefied petroleum gases including a plurality of insulated cargo tanks having the same or different liquefied cargoes therein. In order to control tank conditions, a refrigerating unit is provided with cooling coils extending from the unit to the tops or trunks of each tank so as to cool cargo liquids and to cool and condense cargo vapors within the tank so that condensate is returned to the tank interior. The refrigerating unit and coils are used to extract heat from the cargo liquid and during purging and tank cool-down processes in order to cool the cargo vapors and return the condensed vapors back to the bottom of the tank.

Background

Conventional tankers of the type described normally include a plurality of insulated LPG cargo tanks which during transport are normally partially filled with liquefied cargo. It is known that cargo boiling is continuous and in order to prevent excess loss of cargo, the boil-off vapors are sometimes applied to a central header system which carries the vapors to a refrigeration unit on board ship. There, the vapors are cooled and condensed back to a liquid and returned to the tanks by way of a return header. Because the various vapors and liquids from the tanks are normally mixed in the header system, only one type of cargo can be carried by conventional tankers for each given header and condensate system.

The present invention avoids the problems mentioned above by providing a refrigeration design including cooling coils extending to or near the tops or trunk of each cargo tank so that the cargo boil-off vapors are condensed without leaving the tank location. In this way, the refrigerant to condense boil-off vapors is brought to the tank instead of the cargo boil-off vapors being brought to the refrigerant. Since there is no mixing of fluids from the several tanks, the present invention for the first time permits a multi-tank LPG tanker to be used to carry a variety of cargo gases.

The invention also affords cargo temperature control by the spraying of liquid cargo over the cooling coils and collecting and returning to the cargo body the cooled liquid cargo.

Briefly stated, one embodiment of the invention includes a refrigerating system of the type described with cooling coils arranged in the top trunk of each cargo tank wherein pumps draw off the liquid cargo from the tank bottom and feed the same to a shower or spray pipe location above the cooling coils. As the spray drifts over the coils, the liquid is further cooled and any cargo vapors condense and fall to a collecting pan which in turn feeds the tops of the pipes extending downward to the bottom of the liquid cargo and opening thereat.

Another embodiment includes cooling coils arranged in the trunk of the tank and a plurality of staggered partitions which force the boil-off to take a tortuous path so as to increase the contact area and time between the boil-off vapors and cooling coils. Again, pumps may deliver liquid cargo spray above the cooling coils which is also further cooled by the coils. The condensed vapors and cooled liquid fall to a collecting pan and are again delivered to pipes which return the liquid and condensate to the bottom of the cargo tank.

According to the invention, the coils at the tank top operate to condense cargo vapors but not gases that would be non-condensible at the refrigerant temperature (e.g. nitrogen) during the purging of the tanks so that less cargo vapor is lost, and flowing cargo vapors in the vent gases are eliminated since they are condensed and return to the tank. Further, by maintaining the cargo liquid cold, certain gases with low boiling temperatures such as ethane portions of commercial propane do not vaporize beyond a limited percentage and need not be recondensed. Thus, the invention permits a system for reliquification at higher temperatures than usual and a reduction in the Charp Impact requirements for the tank and piping systems to a point above −75° F., thereby permitting use of cheaper tank materials. Other advantages of the invention include avoiding delays in ports due to weather conditions where cargo vapors could be carried ashore during venting for example, or permitting the ship to continue venting at sea without changing course even if the wind was carrying the vented vapors back toward the after house, and precooling the tanks during the change from inert gas (or air) to the cargo vapors which decreases cooling time in preparation for loading.

It is therefore an object of the present invention to provide a system which operates with the advantages and avoids the problems as outlined above.

Description of the drawings

Other and further objects of the present invention will become apparent with the following detailed description when taken in view of the appended drawings in which:

FIGURE 1 is a diagrammatic illustration of a transverse vertical section of the tanker and of the stripping and refrigeration systems of the invention.

FIGURE 2 is a diagrammatic illustration of a vertical transverse section through a cargo tank and showing the cargo piping.

FIGURE 3 is a partial vertical section through the trunk of a cargo tank illustrating diagrammatically another embodiment of the invention.

FIGURE 4 is a horizontal section taken along line 4—4 of FIGURE 3.

Detailed description of the embodiments

With reference to FIGURES 1 and 2, a tanker generally indicated as 10, includes a plurality of insulated LPG cargo tanks 12 only one of which is shown. Tanks 12 may be self-supporting tanks or other designs suitably insulated with the standard materials applied to the outer surfaces of the cargo tank. A centerline bulkhead 13 is provided within each tank and is structurally capable of withstanding a full head of cargo on each side. However, the bulkhead 13 is not gas-tight and has suitable openings above the full cargo liquid level to interconnect the vapor spaces of each port and starboard half of the tank. Tanks 12 are otherwise designed and constructed for anticipated loads and are formed of special steel suitable for the low temperature service conditions expected. Tanks 12 can be supported by any suitable insulated arrangement within the hull of vessel 10.

Suitable piping and pressure release valves generally indicated as 40 feed vapors to the relief mast (not shown) and a tank vent line 41 is also provided.

For cargo handling, delivery and return header 46 is provided which feeds through valves 48 and discharges 50 to fill a tank. Valve 52 feeding a spray system 54 may be used to cool down, warm up, or purge tank 12. Line 46 may also feed through valves 47 to spray line 32 during cool down. Main cargo pumps 44 are provided to draw cargo from the bottom of tank 12 through suction lines 56 and feed the same to header 46 which at that time is coupled to a shore connection.

As with conventional tanks, tank 12 is provided with a central dome or trunk 14 to accommodate piping, relief valves, or the like. According to the invention, the refrigerating unit 16 located on tanker 10 operates to cool and deliver refrigerant to refrigerant supply lines 18 and receive warmed refrigerant from refrigerant return lines 20. The refrigerant in lines 20 may be about 50–75% liquid. Any suitable refrigerant, e.g., ammonia, may be used and unit 16 maintains the same about 12–16° F. below the expected cargo temperature. For example, the liquid temperatures of propane, ammonia and butane at atmospheric pressure are −45° F., −28° F. and +10° F., respectively, and the refrigerant temperature can be established accordingly. Cooling coils 22 physically located within trunk 14 are coupled into lines 18 and 20 via lines 24 and 26. Various sections of coils 22 can be isolated or coupled into the refrigerant flow path by operation of the appropriate valves as shown.

At the lowest extremity of the tank, which is preferably aft and near the centerline bulkhead, a pair of stripping pumps 28 are provided on opposite sides of bulkhead 13. Pumps 28 draw from the tank bottom or sump 30 and feed liquefied cargo to a number of horizontal spray pipes 32 located near the top of trunk 14 and above cooling coils 22. A collecting tray or pan 34 is supported beneath coils 22 so as to collect the liquid and condensed vapors falling past and from coils 22. A pair of sumps 36 gather the liquid on tray 34 and feed the same to the top of return pipes 38 which extend downward and open near the bottom of tank 12. At the lowest extremity of the bulkhead 13, located near the stripping pumps sump 30, a sluice valve 42 is provided. This valve 42 is remotely operated from the deck above and from the control room and is sized so that one of the two cargo pumps 44 in each tank half is capable of full rate discharge of both sides of the tank with no greater difference in level on each side than a maximum of, for example, ten feet.

After the tanks and appropriate spaces are inerted with, for example, nitrogen, and during purging of the tanks with product vapors of butane and propane, these vapors (being considerably denser than the inert gas) are introduced into the bottoms of the cargo tanks. As the heavier gas is introduced, it displaces the inert gas across cooling coils and into the tank vent line 41 to the shore gas line and to flare. After a period of time (for example, 2 or 3 hours), the vent product will start to contain some percentage of LPG. At this point, the refrigeration system should be in operation. Some of the LPG in the effluent vapors will then condense on the cooling coils 22 at the top of the tank and the liquid will drop to a collecting tray 34 under the coils and then into a pipeline that will lead the condensate toward the bottom of tank 12. By this process, some pre-cooling of the tanks can be accomplished. This procedure could also be applicable to ammonia, but since the produce vapors in this case are considerably lighter than the inert gas, the ammonia vapors will be led into the top of the tank rather than the bottom, and the arrangement modified so that vapors from the bottom of the tanks would pass over the cooling coils.

However, with the arrangement shown in FIGURES 1 through 4, during the purging, ammonia vapors (which are lighter than air or the inert gas used) would be led into the upper portions of the tanks through valves 48, 73 and 74 through the ammonia scrubber, 75, to the atmosphere, the ammonia scrubber would consist of a water spray tower or a water driven gas ejector. In either case the vapors being removed from the tank would be thoroughly mixed with water and the ammonia portions of the vapor would be absorbed into the water and removed overboard. This would eliminate the possibility of ammonia vapors contaminating the area on or adjacent to the ship. It is noted that a limit of as little as 100 parts per million has been agreed upon as a safe concentration for repeated exposure to ammonia fumes.

After the tank is 95% filled with the cargo vapors at the vapor outlet, cooling is started in the case of ammonia cargo, and will be continued in the case of LPG cargoes. Liquid cargo will be admitted from the liquid loading line 46 into a spray line 54 at the top of each tank. A portion of the line 46 liquid is sprayed over the cooling coils 22 in order to improve cooling efficiency. The rate of cargo introduced into each tank is regulated within safety valve limitations during the cooling period. No vapors need be returned to shore. Spray cooling is continued until the temperature at the bottom of each tank is within about 30° of the intended product temperature. Simultaneous cooling of all cargo tanks for a full cargo of propane may be accomplished within a period of about six hours to the specified temperature. At this stage, spraying is stopped except for the spray onto the cooling coils 22, and cargo loading starts through the filling lines to the bottom of each tank.

During cargo loading, liquid from filling line 46 through valves 47 continues to deliver liquid cargo to spray line 32 so that boil-off is condensed and collected together with cooled liquid by tray 34. The net effect is a continuous removal of heat from the cargo body.

With reference to FIGURES 3 and 4, an alternate arrangement for the present invention is illustrated and where like character references refer to like structure. In that embodiment, a purge connection 72 is provided at the trunk top and a plurality of partitions 60 define a tortuous path through which the boil-off vapors must travel in order to reach the vent safety gas pick ups 62 and 64. Partitions extend from one side of the tank to the other and are supported thereby.

The center partition 61 isolates the bottoms of the right and left sides of trays 34 and the next to adjacent partitions 63 have bottoms spaced from tray 34 so as to permit liquid communication thereacross. The apparatus is designed so that the liquid level is higher than the bottoms of partitions 63 so that traveling vapors must pass over the tops of partitions 63.

Coils 22 are arranged generally as shown spaced from and between the respective partitions so that the spray from lines 32 and/or the boil-off vapors pass over and around each individual coil for maximum efficiency. A pair of drain pipes 66 and 68 collect the condensed liquid and return the same to the bottom of the cargo tank as described for the case of pipes 38. Pipes 66 and 68 have inlets higher than the lowest of coils 22. A pump system 70 for liquid cargo condensate is coupled to draw the liquid from tray 34 and deliver it to any desired location such as another tank or a shore connection.

In operation, it can be seen that the liquid level established on tray 34 is above a portion of the cooling coils 22 so that the liquid therein is super cooled to further enhance efficiency. Super cooled liquid may be returned to the bottom of the tank 12 via lines 66 and 68 or withdrawn by pump system 70.

The further operation of the embodiment of FIGURES 3 and 4 is generally the same as that described above.

It will be understood that other and further modifications can be made to the presently disclosed example of the present invention without departing from the spirit and scope thereof, and although the herein disclosed examples involve tankers, it will be understood that the invention also has utility with shore-based tanks.

What is claimed is:

1. An arrangement for storing or transporting liquefied gases at about ambient pressure comprising a plurality of liquid cargo tanks spaced from each other, a refrigeration system for extracting heat from fluids including a refrigerating means receiving, cooling, and feeding a refrigerant and cooling coils located within each tank near the top thereof and coupled to circulate the refrigerant therethrough, and means at each tank for directing fluid within the tank to heat exchange relation with the cooling coils associated with that tank and permitting the thus cooled fluid to move toward the tank bottom, said means for directing fluid including a spray line located within each tank and near the cooling coils therein and having spray nozzles directed toward the coils.

2. An arrangement as set forth in claim 1 wherein the spray line is above the coils and a condensate collecting tray is arranged within the tank and below the coils but above the maximum storage level for the tank, pipes opening within each tank coupled to each tray therein to direct the collected condensate toward the bottom of the tank.

3. An arrangement as set forth in claim 2 wherein said means further includes a pump near the bottom of each tank for feeding liquid to said spray line therein.

4. An arrangement as set forth in claim 3 wherein a tank fill line is provided with each tank and is coupled to feed the spray line therein.

5. An arrangement as set forth in claim 3 wherein the tray is spaced from the tank walls to permit boil-off vapors to contact the cooling coils.

6. An arrangement for storing or transporting liquefied gases at about ambient pressure comprising a tank with a trunk at the top thereof, a refrigeration system for extracting heat from the fluids within the tank including cooling coils located within said trunk, and means for directing fluid within said tank to heat exchange relation with said cooling coils and permitting the then cooled fluid to move toward the tank bottom, said means for directing fluid including a spray line within the trunk and near the coils and having nozzles directed toward the coils.

7. An arrangement as set forth in claim 6 wherein said means further includes a pump near the bottom of the tank for feeding liquid therefrom to the spray line.

8. An arrangement as set forth in claim 6 wherein a condensate collecting tray is arranged below the coils and is spaced from one of the tank walls to permit boil-off vapors to rise and communicate with the coils.

9. An arrangement as set forth in claim 8 wherein a pipe opening into the tank is coupled to the tray to direct condensate therefrom towards the bottom of the tank.

10. An arrangement as set forth in claim 9 wherein the tray and pipe are arranged so that the condensate liquid level on the tray is below the lowest cooling coil.

11. An arrangement for storing or transporting liquefied gases at about ambient pressure comprising a tank with a trunk at the top thereof, a refrigeration system for extracting heat from the fluids within the tank including cooling coils located within said trunk, and means, including a spray line within the trunk and near the coils and having nozzles directed toward the coils, for directing fluid within said tank to heat exchange relation with said cooling coils and permitting the then cooled fluid to move toward the tank bottom wherein a condensate collecting tray is arranged below the coils and is spaced from one of the tank walls to permit boil-off vapors to rise and communicate with the coils, wherein a pipe opening into the tank is coupled to the tray to direct condensate therefrom towards the bottom of the tank, and wherein the tray has upstanding sides and the pipe has its inlet higher than the lowest cooling coil so that condensate liquid on the tray is directly cooled by the lowest coil.

12. An arrangement as set forth in claim 11 wherein pumps means are provided to draw condensate liquid from said tray.

13. An arrangement as set forth in claim 11 wherein the cooling coils are arranged in zones and staggered partitions are provided to divide the zones and define a tortuous path for moving vapors so that the path including the coils is lengthened for a given distance, said partitions having parts above the tray to permit liquid communication thereon.

14. A tank for storing and transporting liquefied gases at about ambient pressure and comprising means for introducing cargo vapor into the tank for the purpose of purging said tank of unwanted gas; means, in the form of spray lines, for introducing liquid cargo into the tank after said tank has been substantially purged of unwanted gas; refrigeration means positioned within the tank for cooling a portion of said liquid cargo introduced into the tank by means of said spray lines; and means, in the form of discharges, for introducing liquid cargo into the tank after a portion of said tank has been cooled to substantially the intended cargo temperature, said spray lines becoming inoperative after said discharge means become operative.

15. The invention as set forth in claim 14 wherein said refrigeration means takes the form of coils positioned within the tank.

16. The tank as recited in claim 15 wherein said spray lines form two integral units, the first unit serving to introduce the liquid cargo free from the effect of the refrigeration means and the second unit serving to introduce the liquid cargo in such a manner that the cargo introduced thereby is cooled by said refrigeration means.

17. The invention of claim 16 wherein the second unit of said spray lines serves to spray the liquid cargo onto said refrigeration coils.

18. The tank as recited in claim 17 and further comprising a condensate collecting tray positioned so that the liquid cargo emergent from the second unit of said spray lines is captured thereby after said cargo has contacted the refrigeration coils.

19. The invention as set forth in claim 18 and further comprising means for feeding the liquid cargo housed in the collecting tray to the bottom of said storing and transporting tank.

20. The tank as recited in claim 19 and further comprising pump means for feeding liquid cargo from the bottom of said tank to the second unit of said spray lines thereby providing a continuous cooling operation for maintaining the liquid cargo housed in the tank at a desired temperature.

References Cited

UNITED STATES PATENTS

| | | | |
|---|---|---|---|
| 2,753,691 | 7/1956 | Wissmiller | 62—54 |
| 2,790,307 | 4/1957 | Ayres | 62—55 |
| 3,098,362 | 7/1963 | Sohda et al. | 62—54 |
| 3,159,004 | 12/1964 | Keith | 62—55 |
| 3,191,394 | 6/1965 | Avery et al. | 62—54 |
| 3,191,395 | 6/1965 | Maher et al. | 62—54 |
| 3,195,316 | 7/1965 | Maher et al. | 62—54 |
| 3,196,623 | 7/1965 | Kelly | 62—54 |
| 3,302,416 | 2/1967 | Proctor et al. | 62—55 |

LLOYD L. KING, *Primary Examiner.*

U.S. Cl. X.R.
62—54, 55, 240